US010183472B2

(12) United States Patent
Soma

(10) Patent No.: US 10,183,472 B2
(45) Date of Patent: Jan. 22, 2019

(54) PRODUCING METHOD OF PART WITH ADHESIVE, AND PART WITH ADHESIVE

(71) Applicant: MELTEC CORPORATION, Kashiwa-shi (JP)

(72) Inventor: Kenji Soma, Nagareyama (JP)

(73) Assignee: MELTEC CORPORATION, Kashiwa-shi (JP)

( * ) Notice: Subject to any disclaimer, the term of this patent is extended or adjusted under 35 U.S.C. 154(b) by 0 days.

(21) Appl. No.: 15/316,572

(22) PCT Filed: Jul. 6, 2016

(86) PCT No.: PCT/JP2016/069985
§ 371 (c)(1),
(2) Date: Dec. 6, 2016

(87) PCT Pub. No.: WO2017/006957
PCT Pub. Date: Jan. 12, 2017

(65) Prior Publication Data
US 2017/0198172 A1    Jul. 13, 2017

(30) Foreign Application Priority Data

Jul. 7, 2015   (JP) ................. 2015-135849

(51) Int. Cl.
*B32B 37/12*   (2006.01)
*B32B 37/26*   (2006.01)
*B32B 38/00*   (2006.01)
*B32B 38/04*   (2006.01)
*G01D 5/347*   (2006.01)

(52) U.S. Cl.
CPC .......... *B32B 37/12* (2013.01); *B32B 38/0008* (2013.01); *B32B 38/04* (2013.01);
(Continued)

(58) Field of Classification Search
CPC .............. B32B 2038/042; B32B 37/12; B32B 38/0008; B32B 38/04; B32B 38/145;
(Continued)

(56) References Cited

U.S. PATENT DOCUMENTS

2004/0007252 A1   1/2004  Namikawa et al.
2011/0076430 A1   3/2011  Shigematsu

FOREIGN PATENT DOCUMENTS

| JP | 2002-309194 A | 10/2002 |
| JP | 2010-085578 A | 4/2010 |
| JP | 2010-276920 A | 12/2010 |
| JP | 2011-074133 A | 4/2011 |

OTHER PUBLICATIONS

English translation of JP2010085578.*
(Continued)

*Primary Examiner* — Sonya M Sengupta
(74) *Attorney, Agent, or Firm* — Kratz, Quintos & Hanson, LLP

(57) ABSTRACT

The present invention provides a producing method of a part with adhesive and a part with adhesive produced by the method. The producing method includes: a printing process of applying, by printing, the adhesive 20 which does not express adherence property on at least a portion of a surface forming the part from the base material 1; an ultraviolet irradiation process of irradiating, the base material 1 with ultraviolet 2 to make the adhesive 20 express adherence property; an release paper pasting process of pasting release paper on the base material 1; and an outward form pressing process of punching an outer form of the part. The adhesive is previously adhered to the part before it is punched out from the base material 1, and thus, the adhesive can be adhered to the plurality of parts by one positioning operation, and the productivity can be enhanced.

10 Claims, 9 Drawing Sheets

(52) U.S. Cl.
CPC ....... *B32B 38/145* (2013.01); *G01D 5/34707* (2013.01); *B32B 37/26* (2013.01); *B32B 2037/268* (2013.01); *B32B 2038/042* (2013.01); *C09J 2201/122* (2013.01); *C09J 2201/606* (2013.01); *C09J 2400/28* (2013.01); *C09J 2467/006* (2013.01); *Y10T 156/1052* (2015.01)

(58) Field of Classification Search
CPC ............ C09J 2201/122; C09J 2201/606; C09J 2400/28; C09J 2467/006; G01D 5/34707
USPC ...................... 156/249, 250, 272.4, 277, 289
See application file for complete search history.

(56) References Cited

OTHER PUBLICATIONS

English translation of JP2010276920.*
English translation of Written Opinion of PCT/JP2016/069985.*
English translation of JP2002309194.*
English translation of JP2011074133.*
English translation of JP09-014903.*
International Search Report issued in PCT application No. PCT/JP2016/069985.
Notice of Reasons for Rejection (1st Office Action) dated Apr. 5, 2016 in corresponding Japanese patent application No. 2015-135849, with translation.

* cited by examiner

[Fig. 1]
(a)
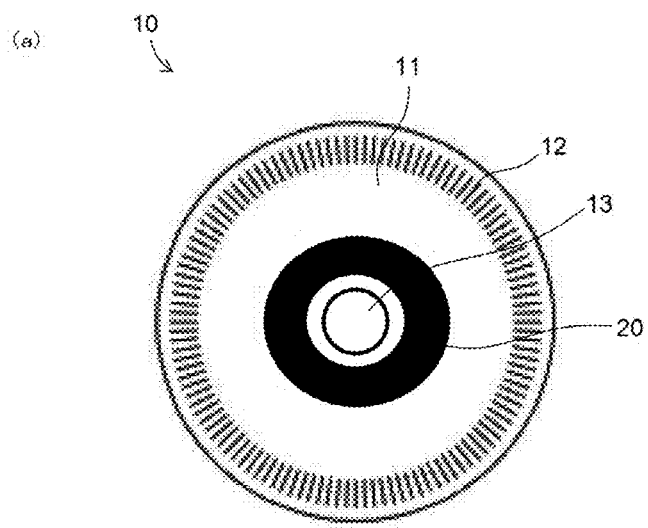
(b)
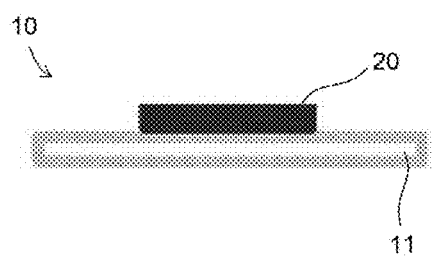

[Fig. 2]
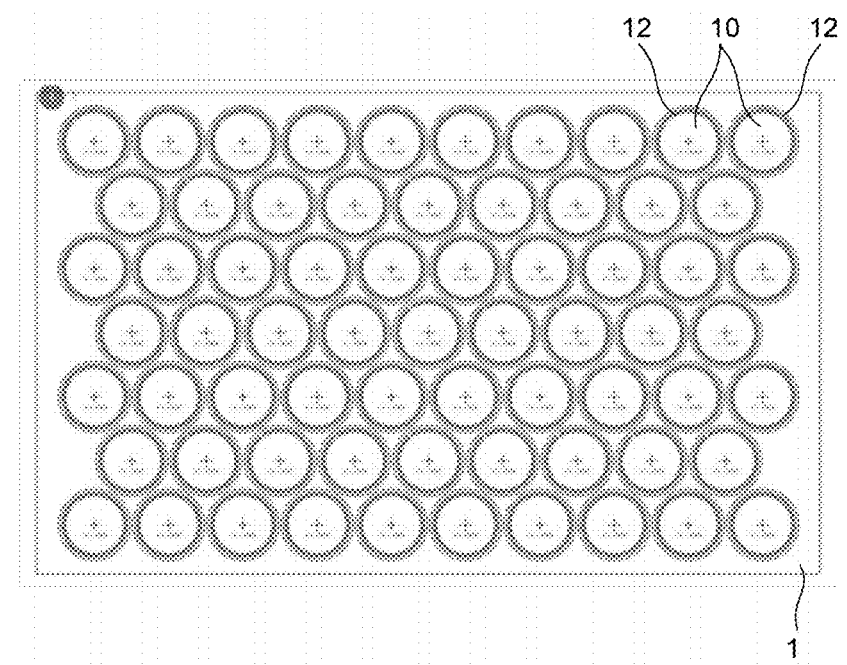

[Fig. 3]
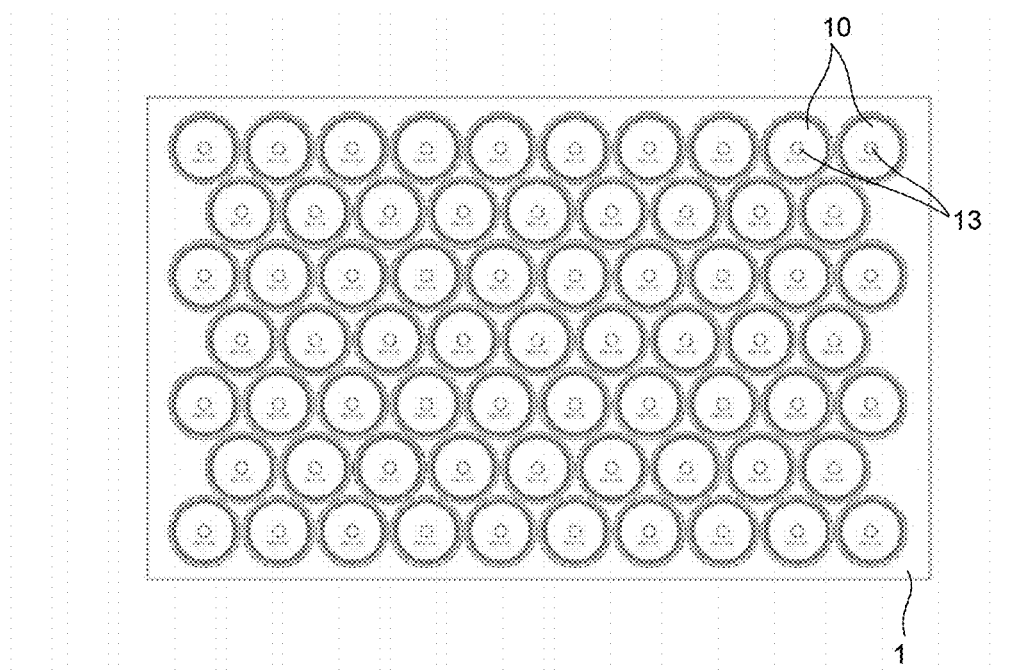

[Fig. 4]
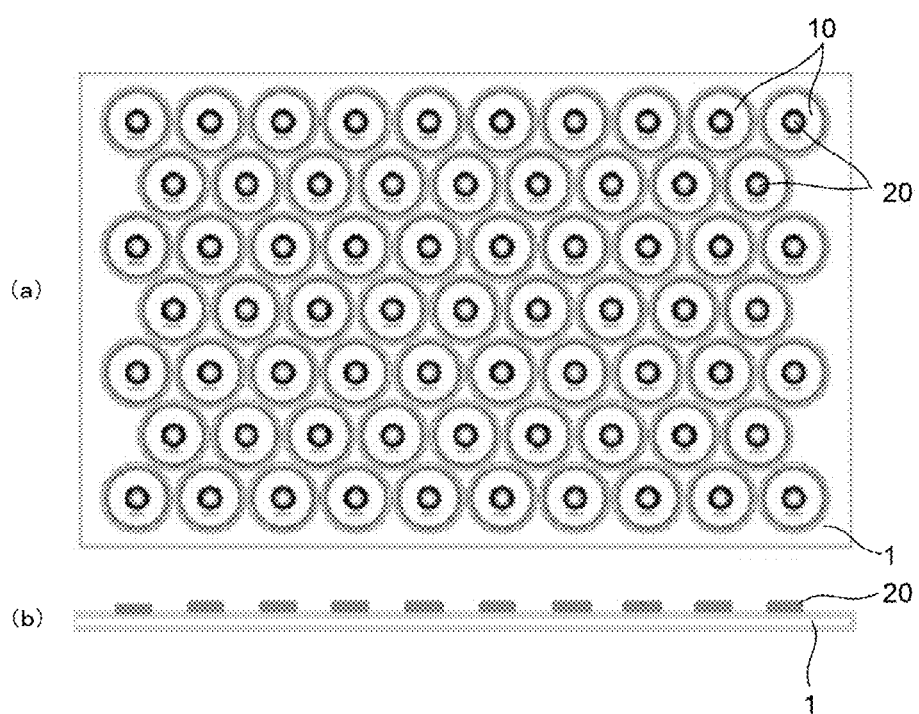

[Fig. 5]
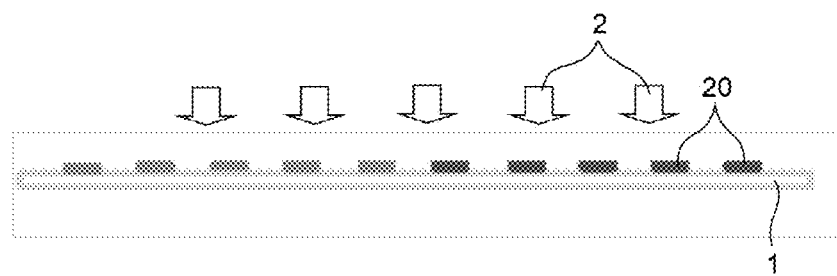

[Fig. 6]

[Fig. 7]
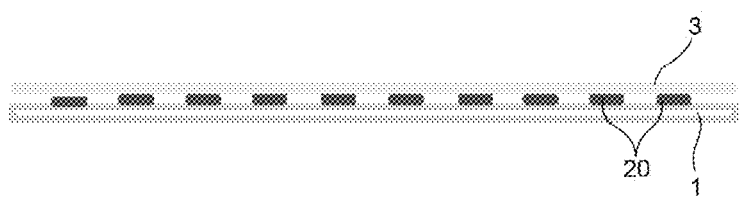

[Fig. 8]
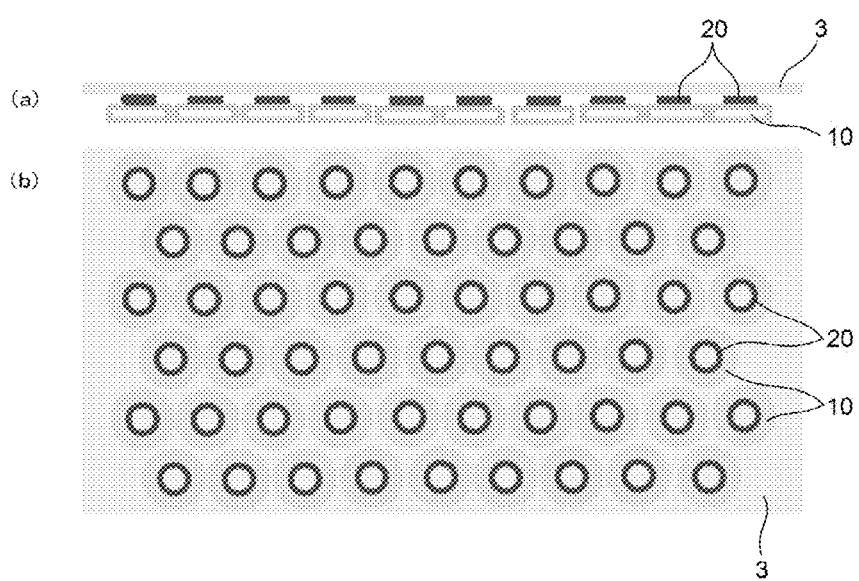

[Fig. 9]
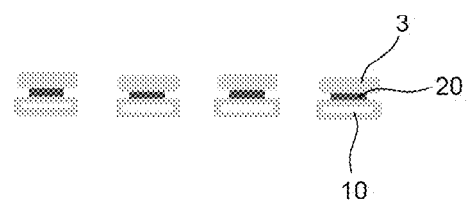

PRODUCING METHOD OF PART WITH ADHESIVE, AND PART WITH ADHESIVE

TECHNICAL FIELD

The present invention relates to a producing method of a part with an adhesive to which adhesive expressing adherence property by irradiating with ultraviolet is adhered.

BACKGROUND TECHNIQUE

For example, an encoder which detects a rotation amount or a rotation direction of a small motor is pasted on a motor-side device by an adhesive and is used.

When the encoder is pasted on the motor-side device by an adhesive, it is necessary to previously adhere the adhesive to the encoder, and they are adhered to each other using a double-faced tape. When the double-faced tape is used, each of double-faced tapes having a predetermined shape laminated on a long peel-off sheet is peeled off, front and back surfaces of each of the encoders are checked, and the double-faced tape is pasted on the front surface.

Patent document 1 discloses that a magnetic pole-detecting slit plate made of glass material is fixed to a rotation disk by means of ultraviolet-curable type adhesion.

Patent document 2 discloses that an energy line curable adhesive is used as adhesion sheet having a predetermined shape laminated on a long peel-off sheet is used.

Patent document 3 discloses a method and a jig capable of efficiently adhering an adhesive on a thin part with uniform thickness into appropriate thickness.

Patent document 4 disclose that an uncured radiation curable adhesive component is printed on a subject matter by screen printing and after the printing, and the radiation curable adhesive component is irradiated with ultraviolet, thereby forming an adhesive having predetermined shape on the subject matter.

PRIOR ART DOCUMENTS

Patent Documents

[Patent Document 1] Japanese Patent Application Laid-open No. 2009-128246
[Patent Document 2] Japanese Patent Application Laid-open No. 2006-224581
[Patent Document 3] Japanese Patent Application Laid-open No. 2005-74752
[Patent Document 4] Japanese Patent Application Laid-open No. 2013-216742

SUMMARY OF THE INVENTION

Problem to be Solved by the Invention

According to the operation for pasting the double-faced tape to the encoder, the precise pasting operation becomes more difficult as a diameter of the encoder becomes smaller, and since it is necessary to individually carry out the pasting operation of the double-faced tape, there is a problem in productivity.

The patent documents 1, 2 and 4 disclose that ultraviolet-curable type adhesion is used, but these patent documents do not propose a producing method of a part with adhesive to which an adhesive is previously applied to a part formed by punching from the base material.

In the patent document 3, an adhesive layer formed into a shape of a part is formed on a surface of a pasted board film and the part is fitted to a position of this adhesive layer and therefore, a jig is required for positioning of the part.

It is an object of the present invention to provide a producing method of apart with adhesive and apart with adhesive produced by this method such that since the adhesive previously is adhered to a part before it is punched from the base material without individually carrying out the pasting operation, an adhesive can be adhered to a plurality of parts by one positioning operation pasting operation of the double-faced tape which was carried out for each of parts becomes unnecessary, and the productivity can be enhanced.

Means for Solving the Problem

According to a first aspect to the present invention, there is provided a producing method of a part with adhesive in which a plurality of parts are placed on one base material, the base material itself configures the parts, and the parts to which the adhesive adheres is produced by punching the parts from the base material, wherein the producing method includes: a printing process of applying, by printing, the adhesive which does not express adherence property on at least a portion of a surface forming the part from one of surfaces of the base material; an ultraviolet irradiation process of irradiating, after the printing process, the base material with ultraviolet to make the adhesive express adherence property; a release paper pasting process of pasting release paper on the one surface of the base material; and an outward form pressing process of punching an outer form of the part.

According to a second aspect of the invention, in the producing method for the part with adhesive of the first aspect, the outward form pressing process is carried out without punching the release paper from an other surface of the base material.

According to a third aspect of the invention, in the producing method for the part with adhesive of the first aspect, the release paper is punched out in the outward form pressing process.

According to a fourth aspect of the invention, in the producing method for the part with adhesive of any the one of first to third aspects, before the printing process, for the part, a surface processing process is carried out by evaporation, plating or etching, or a punching working process is carried out by punching working.

According to a fifth aspect of the invention, in the producing method for the part with adhesive of any the one of first to third aspects, the base material is a PET film, and the part is an encoder, and a slit pattern is formed in the part before the printing process.

According to a sixth aspect of the invention, in the producing method for the part with adhesive of any the one of first to third aspects, the base material is a PET film, and the part is an encoder, and a hole is formed in the part by punching working before the printing process.

According to a seventh aspect of the invention, in the producing method for the part with adhesive of any the one of first to third aspects, the base material is a translucent PET film, and the part is a rotary encoder, the producing method further includes a slit pattern process of forming a light-blocking pattern in the part, and an inner-diameter punching working process of forming a center hole in the part, a motor shaft being inserted into the center hole, and, the slit pattern process and the inner-diameter punching working process are carried out before the printing process.

According to an eighth aspect of the invention, in the producing method for the part with adhesive of any the one of first to seventh aspects, the printing is carried out by screen printing.

A ninth aspect of the invention provides the part with adhesive produced by the producing method of a part with adhesive of any one of the first to eighth aspects, the parts with adhesive are arranged on the release paper.

A tenth aspect of the invention provides the part with adhesive produced by the producing method of a part with adhesive of any one of the first to eighth aspects, the adhesive which expresses adherence property is adhered.

An eleventh aspect of the invention provides a part with adhesive formed by punching from a base material, wherein the adhesive which is applied by printing, and which is irradiated with ultraviolet to express adherence property is adhered.

Effect of the Invention

According to the producing method of a part with adhesive of the present invention, an adhesive can be adhered to a plurality of parts by one positioning operation, a pasting operation of a double-faced tape which was carried out for each of the parts becomes unnecessary, and the productivity can be enhanced.

BRIEF DESCRIPTION OF THE DRAWINGS

FIG. 1(a) and FIG. 1(b) are a plan view and a side view of a part with adhesive produced by a producing method of a part with adhesive according to an embodiment of the present invention;

FIG. 2 shows a surface processing process in the producing method of the part with adhesive according to the embodiment of the invention;

FIG. 3 shows a punching working process in the producing method of the part with adhesive according to the embodiment of the invention;

FIG. 4(a) and FIG. 4(b) show a printing process in the producing method of the part with adhesive according to the embodiment of the invention;

FIG. 5 shows an ultraviolet irradiation process in the producing method of the part with adhesive according to the embodiment of the invention;

FIG. 6 shows an outward appearance-inspection process in the producing method of the part with adhesive according to the embodiment of the invention;

FIG. 7 shows a release paper pasting process in the producing method of the part with adhesive according to the embodiment of the invention;

FIG. 8(a) and FIG. 8(b) show an outward form pressing process in the producing method of the part with adhesive according to the embodiment of the invention; and FIG. 9 shows an outward form pressing process in a producing method of a part with adhesive according to another embodiment of the invention.

MODE FOR CARRYING OUT THE INVENTION

The producing method of a part with adhesive of the first aspect of the invention includes a printing process of applying, by printing, the adhesive which does not express adherence property on at least a portion of a surface forming the part from one of surfaces of the base material; an ultraviolet irradiation process of irradiating, after the printing process, the base material with ultraviolet to make the adhesive express adherence property; a release paper pasting process of pasting release paper on the one surface of the base material; and an outward form pressing process of punching an outer form of the part. According to this aspect, since an adhesive is adhered to the part placed on the base material by printing, the adhesive can be adhered before the part is divided into individual pieces and thus, the adhesive can be adhered to the plurality of parts by one positioning operation, the pasting operation of the double-faced tape which was carried out for each of the parts becomes unnecessary, and productivity can be enhanced.

According to the second aspect, in the producing method of the part with adhesive of the first aspect, the outward form pressing process is carried out without punching the release paper from an other surface of the base material. According to this aspect, parts with adhesive after the part is divided into individual pieces are placed on the release paper, it is easy to transfer the parts and to handle the parts thereafter.

According to the third aspect, in the producing method of the part with adhesive of the first aspect, the outward form pressing process punches the release paper. According to aspect, the part with adhesive can be is divided into individual pieces in a state where the release paper is attached.

According to the fourth aspect, in the producing method of the part with adhesive of any one of the first to third aspects, before the printing process, for the part, a surface processing process is carried out by evaporation, plating or etching, or a punching working process is carried out by punching working. According to this aspect, it is possible to freely carry out the surface process and the process by the punching working, for the part.

According to the fifth aspect, in the producing method of the part with adhesive of any one of the first to third aspects, the base material is a PET film, and the part is an encoder, and a slit pattern is formed in the part before the printing process. According to this aspect, it is possible to form a translucent slit or a light-blocking slit in the PET film, and it is possible to obtain a part with adhesive formed with a slit pattern.

According to the sixth aspect, in the producing method of the part with adhesive of any one of the first to third aspects, the base material is a PET film, and the part is an encoder, and a hole is formed in the part by punching working before the printing process. According to this aspect, it is possible to form a hole in the PET film, and it is possible to obtain a part with adhesive formed with the hole.

According to the seventh aspect, in the producing method of the part with adhesive of any one of the first to third aspects, the base material is a translucent PET film, and the part is a rotary encoder, the producing method further includes a slit pattern process of forming a light-blocking pattern in the part, and an inner-diameter punching working process of forming a center hole in the part, a motor shaft being inserted into the center hole, and, the slit pattern process and the inner-diameter punching working process are carried out before the printing process. According to this aspect, it is possible to form the light-blocking slit and the center hole through which a motor shaft is inserted in the translucent PET film, and it is possible to obtain a rotary encoder having an adhesive.

According to the eighth aspect, in the producing method of the part with adhesive of any one of the first to seventh aspects, the printing is carried out by screen printing. According to this aspect, since the printing is carried out by the screen printing, it is easy to adjust the film thickness of an adhesive, and it is possible to easily adjust the peeling strength and a holding force by a film thickness.

According to the ninth aspect, in the part with adhesive produced by the producing method of any one of the first to eighth aspects, the parts with adhesive are arranged on the release paper. According to this aspect, since the parts with adhesive after the part is divided into individual pieces are placed on the release paper, it is easy to transfer the parts and handle of the parts thereafter.

According to the tenth aspect, in the part with adhesive produced by the producing method of any one of the first to eighth aspects, the adhesive which expresses adherence property is adhered. According to this aspect, since an adhesive is adhered to the part placed on the base material by printing, the adhesive can be adhered before the part is divided into individual pieces and thus, the adhesive can be adhered to the plurality of parts by one positioning operation, the pasting operation of the double-faced tape which was carried out for each of the parts becomes unnecessary, and the productivity can be enhanced.

In the part with adhesive of the eleventh aspect of the invention, the adhesive which is applied by printing, and which is irradiated with ultraviolet to express adherence property is adhered. According to this aspect, since an adhesive is adhered to the part placed on the base material by printing, the adhesive can be adhered before the part is divided into individual pieces and thus, the adhesive can be adhered to the plurality of parts by one positioning operation, the pasting operation of the double-faced tape which was carried out for each of the parts becomes unnecessary, and the productivity can be enhanced.

Embodiment

An embodiment of the present invention will be described below together with drawings.

FIG. 1(*a*) and FIG. 1(*b*) show a part with adhesive produced by a producing method of the embodiment, wherein FIG. 1(*a*) is a plan view of the part with adhesive, and FIG. 1(*b*) is a side view of the part with adhesive.

The embodiment will be described that a part with adhesive is an optical rotary encoder which detects a rotation amount or a rotation direction of a motor.

In a rotary encoder (part with adhesive) 10 of the embodiment, an encoder disk 11 is made of polyethylene terephthalate (PET) translucent material. The encoder disk 11 is formed with slit patterns 12 which become light-blocking pattern, and a center hole 13 through which a motor shaft is inserted.

An adhesive 20 which expresses adherence property by irradiating with ultraviolet 2 and which is applied by printing is adhered to an outer periphery of the center hole 13 of the encoder disk 11. The rotary encoder 10 is pasted to a motor-side device by the adhesive 20.

FIG. 2, FIG. 3, FIG. 4(*a*), FIG. 4(*b*), FIG. 5, FIG. 6 and FIG. 7 show a producing method of the part with adhesive of the embodiment, wherein FIG. 2 shows a surface processing process, FIG. 3 shows a punching working process, FIG. 4(*a*) and FIG. 4(*b*) show a printing process, FIG. 5 shows an ultraviolet irradiation process, FIG. 6 shows an outward appearance-inspection process, FIG. 7 shows a release paper pasting process, and FIG. 8(*a*) and FIG. 8(*b*) show an outward form pressing process.

FIG. 2 shows a split pattern forming process as the surface processing process.

In the split pattern forming process, a translucent PET film is used as abase material 1, and the slit pattern 12 which becomes the light-blocking pattern is formed on each of the rotary encoders 10 placed on one base material 1.

FIG. 3 shows an inner-diameter punching working process as the punching working process.

In the inner-diameter punching working process, the center hole 13 through which the motor shaft is inserted is formed in each of the rotary encoders 10 placed on the one base material 1.

FIG. 4(*a*) and FIG. 4(*b*) show a screen printing process as the printing process.

In the screen printing process, the adhesive 20 which does not express adherence property is applied by printing from one of surfaces of the base material 1 to at least a portion of the surface forming the rotary encoder 10 which forms each of the rotary encoder 10 placed on the one base material 1.

The adhesive 20 used in this embodiment is an adhesive which expresses adherence property by irradiating ultraviolet 2. For example, as screen printing ultraviolet curable pressure sensitive adhesive, it is possible to use JELCOM RAYTACK-10N (made by JUJO-CHEMICAL. CO., LTD) and UV TACK (MADE by T&K TOKA CO., LTD).

FIG. 5 shows the ultraviolet irradiation process, and after the printing process shown in FIG. 4(*a*) and FIG. 4(*b*), the base material 1 is irradiated with ultraviolet 2 so that the adhesive 20 expresses adherence property.

FIG. 6 shows the outward appearance-inspection process, and after the ultraviolet irradiation process shown in FIG. 5, it is checked that the adhesive 20 is applied within a predetermined range of each of the rotary encoders 10 placed on the base material 1.

FIG. 7 shows the release paper pasting process, and after the outward appearance-inspection process shown in FIG. 6, release paper 3 is pasted on one of surfaces of the base material 1.

FIG. 8(*a*) and FIG. 8(*b*) show the outward form pressing process, wherein FIG. 8(*a*) is a side view showing a state after the outward form pressing process, and FIG. 8(*b*) is a plan view in this state.

In the outward form pressing process, after the release paper pasting process shown in FIG. 7, an outer form of the rotary encoder 10 is punched out from the other surface of the base material 1 without punching the release paper 3.

According to this embodiment, the center hole 13 through which the light-blocking slit 12 and the motor shaft are inserted can be formed in the translucent PET film, and the rotary encoder 10 with adhesive can be obtained.

According to the embodiment, since the rotary encoders 10 after they are divided into individual pieces are arranged on the release paper 3, it is easy to transfer the part with adhesive 10 and handle the same after that.

According to the embodiment, since the printing is carried out by screen printing, it is easy to adjust the film thickness of the adhesive 20, and it is possible to easily adjust the peeling strength and the holding force by the film thickness.

FIG. 9 shows an outward form pressing process in a producing method of a part with adhesive in another embodiment.

In the outward form pressing process shown in FIG. 9, the release paper 3 is punched out together with an outer form of the rotary encoder 10.

According to the embodiment, the part with adhesive 10 can be divided into individual pieces in a state where the release paper 3 is attached.

As described above, according to the present invention, the adhesive 20 is adhered to the part placed on the base material 1 by printing, and the adhesive 20 can be adhered before the part is divided into individual pieces. Therefore, the adhesive 20 can be adhered to the plurality of parts by one positioning operation, the pasting operation of the double-faced tape which was carried out for each of the parts becomes unnecessary, and the productivity can be enhanced.

According to the present invention, the surface processing process is carried out for a part by evaporation, plating or etching, or the punching working process is carried out by punching working for apart before the printing process. According to this, it is possible to freely carry out the surface processing or the processing by punching working for a part without receiving influence of the adhesive 20.

Although the slit pattern processing process for forming a light-blocking pattern is shown in the above embodiment, the translucent slit may be formed in a light-blocking PET film, and it is possible to obtain a part with adhesive 10 formed with a slit pattern by forming a translucent slit or a light-blocking slit in the PET film.

Although the slit pattern forming process is shown as the surface processing process in the embodiment, as the surface process, it is possible to employ a surface process by evaporation, plating or etching.

Although the inner-diameter punching working process is shown in the embodiment, it is possible to form holes, projections and depressions by the punching working in addition to the inner-diameter punching working or to form them by the punching working instead of the inner-diameter punching working, and it is possible to obtain an adhesive 10 formed with holes, projections and depressions.

Although the rotary encoder 10 is used in the embodiment, it is also possible to similarly produce a liner encoder, and the present invention is preferable to produce a small part such as a light-blocking plate used in a camera module for example.

The printing may be offset printing, gravure printing or inkjet printing in addition to the screen printing.

As the base material 1, it is possible to use resin sheet such as polycarbonate (PC), polymethylmethacrylate resin (PMMA), and metal sheet such as SUS, Cu and Ni in addition to the PET film.

INDUSTRIAL APPLICABILITY

The producing method of a part with adhesive of the present invention is suitable for producing a small mechanical part such as an encoder, but can widely be used for producing parts which are adhered by adhesive.

EXPLANATION OF SYMBOLS 1 base material
2 ultraviolet
3 release paper
10 rotary encoder (part with adhesive)
11 encoder disk
12 slit patterns
13 center hole
20 adhesive

The invention claimed is:
1. A producing method of a part with adhesive in which a plurality of parts are placed on one base material, the base material itself configures the parts, and the parts to which the adhesive adheres is produced by punching the parts from the base material, wherein the producing method includes:
   a printing process of applying, by printing, the adhesive which does not express adherence property on at least a portion of a surface forming the part from one of surfaces of the base material;
   an ultraviolet irradiation process of irradiating, after the printing process, the base material with ultraviolet to make the adhesive express adherence property;
   a release paper pasting process of pasting release paper on the one surface of the base material; and
   an outward form pressing process of punching an outer form of the part,
   wherein the base material is a PET film, and the part is an encoder, and
   a slit pattern is formed in the part before the printing process.

2. The producing method of the part with adhesive according to claim 1, wherein the outward form pressing process is carried out without punching the release paper from an other surface of the base material.

3. The producing method of the part with adhesive according to claim 1, wherein the release paper is punched out in the outward form pressing process.

4. The producing method of the part with adhesive according to claim 1, wherein before the printing process, for the part, a surface processing process is carried out by evaporation, plating or etching, or a punching working process is carried out by punching working.

5. A producing method of a part with adhesive in which a plurality of parts are placed on one base material, the base material itself configures the parts, and the parts to which the adhesive adheres is produced by punching the parts from the base material, wherein the producing method includes:
   a printing process of applying, by printing, the adhesive which does not express adherence property on at least a portion of a surface forming the part from one of surfaces of the base material;
   an ultraviolet irradiation process of irradiating, after the printing process, the base material with ultraviolet to make the adhesive express adherence property;
   a release paper pasting process of pasting release paper on the one surface of the base material; and
   an outward form pressing process of punching an outer form of the part,
   wherein the base material is a PET film, and the part is an encoder, and
   a hole is formed in the part by punching working before the printing process.

6. A producing method of a part with adhesive in which a plurality of parts are placed on one base material, the base material itself configures the parts, and the parts to which the adhesive adheres is produced by punching the parts from the base material, wherein the producing method includes:
   a printing process of applying, by printing, the adhesive which does not express adherence property on at least a portion of a surface forming the part from one of surfaces of the base material;
   an ultraviolet irradiation process of irradiating, after the printing process, the base material with ultraviolet to make the adhesive express adherence property;
   a release paper pasting process of pasting release paper on the one surface of the base material; and
   an outward form pressing process of punching an outer form of the part, wherein the base material is a translucent PET film, and the part is a rotary encoder,
   the producing method further includes:
   a slit pattern process of forming a light-blocking pattern in the part, and
   an inner-diameter punching working process of forming a center hole in the part, a motor shaft being inserted into the center hole, and, the slit pattern process and the inner-diameter punching working process are carried out before the printing process.

7. The producing method of the part with adhesive according to claim 1, wherein the printing is carried out by screen printing.

8. A part with adhesive produced by the producing method of the part with adhesive according to claim 1, wherein the parts with adhesive are arranged on the release paper.

9. A part with adhesive produced by the producing method of the part with adhesive according to claim 1, wherein the adhesive which expresses adherence property is adhered.

10. A part with adhesive formed by punching from a base material, wherein the adhesive which is applied by printing, and which is irradiated with ultraviolet to express adherence property is adhered.

\* \* \* \* \*